United States Patent Office 3,072,574
Patented Jan. 8, 1963

3,072,574
GAS LUBRICANT COMPOSITIONS
Donald H. Buckley, Cleveland, and Robert L. Johnson, Fairview Park, Ohio, assignors to the United States of America as represented by the Administrator of the National Aeronautics and Space Administration
No Drawing. Filed Oct. 27, 1960, Ser. No. 65,548
6 Claims. (Cl. 252—58)
(Granted under Title 35, U.S. Code (1952), sec. 266)

The invention described herein may be manufactured and used by or for the Government of the United States of America for governmental purposes without the payment of any royalties thereon or therefor.

This invention pertains to high temperature gas lubricants and more particularly to mixtures of halogen-containing gases.

Extreme high temperature lubrication is required for advanced types of aerodynamic and space vehicles. For example, in missile components such as turbodrives, environmental temperatures from 1000° to 1800° F. create an important problem area for lubrication. Temperatures of this magnitude are beyond the useful limit of conventional organic liquids and greases and, therefore, unconventional methods of lubrication are needed. Halogen-substituted methane and similar gases are found to provide the necessary lubrication at the extreme high temperatures. A number of such gaseous compounds possess extremely good thermal stability and are capable of providing effective lubrication.

The mechanism for gas lubrication is similar to that encountered in extreme pressure lubrication of gears where reactive compounds are used as additives to oil. The gases employed as lubricants are stable in contact with metal surfaces at ambient temperatures. Where metals are in sliding contact, however, extremely high flash temperatures are generated at contacting metal surfaces; for example, 1100° F. above the ambient temperature in effective boundary lubrication. These temperatures are sufficient to cause localized decomposition of gas molecules adsorbed on the metal surface. The halogen atoms of the molecule are then free to react with the hot metal surface to form metal halides which function as solid lubricants. The nature of the metallic halides formed on the sliding surface and the rate at which they form determine the effectiveness of the lubrication system. When the reaction rate is exceedingly high, an excess of metallic halide may form and thus result in corrosion of the surface. For example, a corrosion problem is encountered in lubricating tool steel with a halogen-containing gas above 600° F. but the use of cobalt and nickel base alloys eliminate the corrosion problem.

In gas lubrication where surface reactions are important, the gas must have the proper halogen content. It is necessary to have sufficient halogen present in the gaseous molecule to satisfy lubrication requirements and yet not such an excess that would cause corrosion at high temperatures. The gas $CF_3Br$ has a single forming atom and provides effective lubrication at high temperatures. At room temperatures, however, insufficient bromine is present to provide adequate lubrication. The gas $CF_2Br_2$ has two forming atoms and provides effective lubrication at lower temperatures, that is, below 800° F. At higher temperatures, however, corrosive wear with the metals is experienced with $CF_2Br_2$. To obtain the proper halogen content, the two gases can be blended in optimum proportions and thus it is possible to obtain effective lubrication over a broad temperature range without corrosive wear.

An object of this invention is to provide an extreme high temperature lubricant.

An additional object of this invention is to provide a high temperature lubricant comprised of the mixture of halogen-containing gases.

A further object of this invention is to provide a halogen-containing gas mixture for high temperature lubrication which minimizes corrosive wear.

A still further object of this invention is to provide halogen-containing gas mixtures for high temperature lubrication of surfaces in solid contact.

A still additional object of this invention is to provide halogen-containing gas mixtures that will form reaction films with various alloys wherein such films have desirable lubricating properties.

Other objects and many attendant advantages of the present invention will be apparent from the following detailed description of the invention.

As a basis of this invention, it has been discovered that a gas blend of $CF_2Br_2$ and $CF_3Br$ is found to be an effective lubricant to 1200° F. for various metal combinations. A 1 to 1 gas blend of the two compounds was found to provide a synergistic effect as will be seen from the following detailed results of experimentation.

The apparatus used in determining the effect of the compounds as lubricants consists essentially of a rotating-disc specimen 2½ inch diameter and a hemispherically-tipped rider specimen 3/16 inch radius. The rider specimen is stationary and in sliding contact with the rotating-disc specimen. The disc is rotated by means of an electric motor through a variable-speed transmission. Loads are applied to the rider specimen by means of a dead weight system. The frictional force is measured directly by means of 4 strain gages mounted on a copper-beryllium dynamometer ring. The frictional force is continuously recorded on a strip-chart potentiometer. After the experiment the wear volume is calculated from the measured diameter of the wear area on the rider specimen. The compositions of various alloys used in the particular tests are presented in the following table:

TABLE I

| Material | Typical composition, percent by weight | | | | | | | | | Average hardness, Rockwell C- |
|---|---|---|---|---|---|---|---|---|---|---|
| | Fe | C | Si | Ni | Cr | Co | W | Mo | Other | |
| Hastelloy C | 6.0 | | | 52.0 | 17.0 | | 19.0 | 5.0 | Mn, Si | 33 |
| Inconel X | 5 to 9 | 0.08 | 0.50 | 70.0 | 15.0 | | | | Mn, S, Al, Cb | 29 |
| Stellite 98M2 | 3.0 | 2.0 | 1.0 | 3.5 | 30.5 | 40.0 | 18.5 | | B, V | 52-57 |
| Rexalloy 33 | 3.0 | 2.25 | 1.0 | .25 | 32.5 | 44.0 | 17.0 | | | 52-55 |

The gaseous lubricants are introduced into a tube leader Inconel pot that encloses the disc and rider specimen. The Inconel pot is heated by means of strip heaters mounted on the outer walls in concentric ring heaters in the base of the pot. The strip and ring heaters are controlled by individual Variac units. The temperature is measured by an Inconel-sheathed Chromel-Alumel thermocouple located along the side of the disc specimen. The temperatures which varied from 75° to 1200° F. are read from an indicating potentiometer. The Inconel test chamber is purged for a 15-minute period prior to actual starting of the run. The specimens are brought to temperature in air before the period of purge is initiated. The gas flow at a rate of 1 liter per minute and mixtures used in the purge were the same as those employed in the run. At the completion of the purge the run-in procedure is initiated. Measurements show that less than 0.5% oxygen is present in the test chamber after purge.

TABLE II

*Rider Wear (in.$^3$/hr.$\times 10^{-5}$)*
*Stellite 98M2 Rider Sliding on Hastelloy C*

| Temperature, °F. | Air | $CF_2Br_2$ | $CF_3Br$ | 1:1 | 40% $CF_3Br$, 60% $CF_2Br_2$ | 40% $CF_2Br_2$, 60% $CF_3Br$ |
|---|---|---|---|---|---|---|
| 75 | 0.5 | 0.004 | 0.037 | 0.002 | 0.003 | 0.0056 |
| 1,200 | .30 | .04 | .006 | .004 | .004 | |

The results of tests are shown in Table II. In all the runs, the total amount of gas was one liter per minute. Thus, in the synergistic 1:1 mixture, there was 0.50 liter per minute of each of the two gases. As can be seen, the 1:1 mixture of $CF_2Br_2$ and $CF_3Br$ gave better wear results than either of the gases alone. The mixture of 40 percent $CF_3Br$ and 60 percent $CF_2Br_2$ additionally gave better results than the use of either of the gases alone. The mixture of 40 percent $CF_2Br_2$ and 60 percent $CF_3Br$ produced results slightly above the lowest values obtained when using the individual gases, but there still exists clear evidence of a synergistic result, as it would be expected that at 75° F. the wear would be above 0.0205 in.$^3$/hr.$\times 10^{-5}$ which is the mean between the values obtained using either of the gases alone. Essentially the same results are obtained when using a Rexalloy 33 rider sliding on Inconel X.

The use of the mixture of gases set forth in this invention is not at all limited to the particular alloys set forth in the testing of the lubricant.

Obviously, many modifications and variations of the present invention are possible in the light of the above teachings. It is, therefore, to be understood that within the scope of the appended claims the invention may be practiced other than as specifically described.

What is claimed:

1. A gaseous lubricant composition consisting essentially of from 40 to 60 percent $CF_2Br_2$ and from 40 to 60 percent $CF_3Br$.
2. A gaseous lubricant composition consisting essentially of 50 percent $CF_2Br_2$ and 50 percent $CF_3Br$.
3. A gaseous lubricant composition consisting essentially of 60 percent $CF_2Br_2$ and 40 percent $CF_3Br$.
4. A gaseous lubricant composition consisting essentially of 60 percent $CF_3Br$ and 40 percent $CF_2Br_2$.
5. A method of lubricating metal surfaces comprising the steps of enclosing said surfaces in a gastight chamber, and circulating a gaseous lubricant composition consisting essentially of from 40 to 60 percent $CF_2Br_2$ and from 40 to 60 percent of $CF_3Br$ through said chamber.
6. A method of lubricating metal surfaces comprising the steps of enclosing said surfaces in a gastight chamber, and circulating a gaseous lubricant composition consisting essentially of 50 percent $CF_2Br_2$ and 50 percent of $CF_3Br$ through said chamber.

References Cited in the file of this patent

Lubricating Engineering, November 1958, p. 454.

UNITED STATES PATENT OFFICE

CERTIFICATE OF CORRECTION

Patent No. 3,072,574January 8, 1962

Donald H. Buckley et al.

It is hereby certified that error appears in the above numbered patent requiring correction and that the said Letters Patent should read as corrected below.

Columns 1 and 2, Table I, under the heading "W" for "19.0" read -- 5.0 --; same Table I, under the heading "Mo" for "5.0" read -- 19.0 --.

Signed and sealed this 27th day of August 1963.

(SEAL)
Attest:

ERNEST W. SWIDER
Attesting Officer

DAVID L. LADD
Commissioner of Patents